Feb. 24, 1959
F. R. GOLDSCHMIED
2,874,894
GAS REACTION ROTORS
Filed March 1, 1957
2 Sheets-Sheet 1
FIG. 1
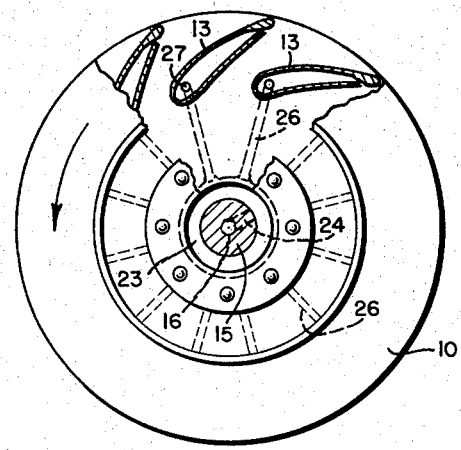
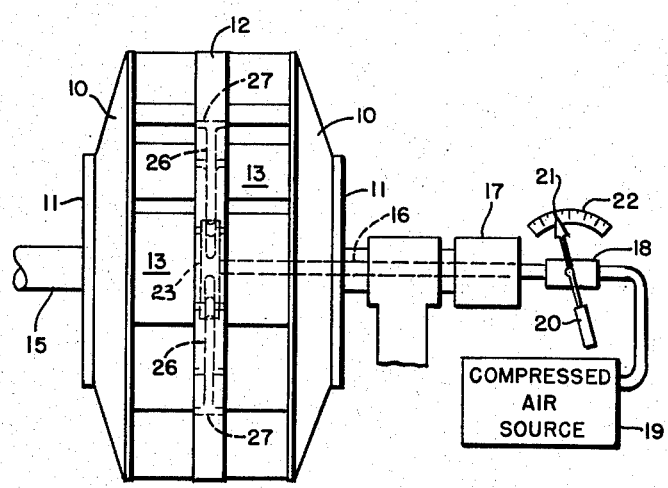
FIG. 2
FABIO R. GOLDSCHMIED
INVENTOR
BY Robert J. Palmer
ATTORNEY Feb. 24, 1959 F. R. GOLDSCHMIED 2,874,894
GAS REACTION ROTORS
Filed March 1, 1957 2 Sheets-Sheet 2

FABIO R. GOLDSCHMIED
INVENTOR
BY Robert J. Palmer
ATTORNEY

United States Patent Office 2,874,894
Patented Feb. 24, 1959

2,874,894

GAS REACTION ROTORS

Fabio R. Goldschmied, Hyde Park, Mass., assignor to Westinghouse Electric Corporation, East Pittsburgh, Pa., a corporation of Pennsylvania Application March 1, 1957, Serial No. 643,462

5 Claims. (Cl. 230—115)

This invention relates to gas reaction rotors, and has as an object to improve the performances of such rotors.

A particular size of fan rotor rotated at its design speed will provide a design increase in gas pressure. In the past, for providing a larger increase in pressure from such a rotor, it had to be provided with more blades or with a larger diameter. Rotating such a rotor at higher than design speeds does not provide satisfactory performance.

In the co-pending U. S. application, Serial No. 627,459, filed December 10, 1956, by J. E. McDonald, there is disclosed a satisfactory method of increasing the gas pressure from such a rotor by blowing air from the interiors of hollow airfoil blades through slots in their driving sides adjacent their trailing edges, the gas being discharged forwardly at substantial angles to the chord lines of the blades. This method has several important commercial advantages. It enables a smaller, less expensive rotor to provide the same increase in gas pressure that a larger, more expensive rotor had previously provided. It enables a rotor designed for normal loads to easily handle peak loads. It also provides an effective volume control since the flow of air out of the slots can be varied.

My invention differs from the one disclosed in said application in that instead of using airfoil blades having the usual relatively sharp trailing edges, I provide airfoil blades having blunt, rounded trailing edges, and instead of placing the gas blowing slots in the driving sides of the blades, I place them in the trailing sides of the blades and arranged to discharge the gas substantially tangential to the curved trailing edges of the blades. The Coanda effect is used to make the gas jets adhere to the curved trailing edges which are shaped to cause the gas jets to be projected forwardly at substantial angles to the chord lines of the blades. Experiments have shown that my form of blades and slots is more effective than those disclosed in said application.

Another object of my invention is to increase the gas pressure from a fan rotor.

My invention will now be described with reference to the annexed drawings, of which:

Fig. 1 is a side view, partially in section, of a centrifugal fan rotor embodying my invention;

Fig. 2 is an end view of the rotor of Fig. 1, and shows also a compressed air source and piping for supplying the compressed air into the fan blades;

Figure 3:
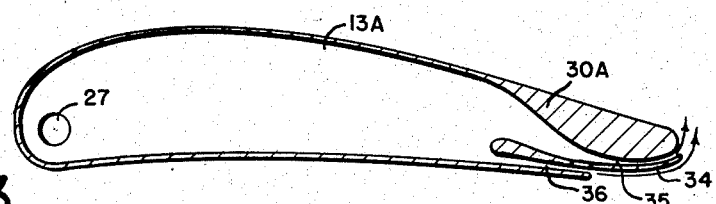
Fig. 3 is an enlarged, sectional view of one form of airfoil blade embodying my invention.

Figs. 1 and 2 of the drawings show a double-inlet, centrifugal fan rotor having side or inlet plates 10 with axial inlet openings 11, having a centerplate 12, and having a plurality of backwardly curved, hollow airfoil blades 13 supported between the centerplate and the side plates. The blades have their noses adjacent the inlets 11, and have their trailing edges adjacent the periphery of the rotor which, with reference to Fig. 1, is designed to be rotated in a counter-clockwise direction. The rotor has a shaft 15 to which the centerplate 12 is attached in a conventional manner.

The shaft 15 has a central air passage 16 at one side of the centerplate, which is connected through a seal 17 and valve 18 to a source of compressed air 19. The valve 18 has an adjusting arm 20, one end of which has an indicator 21 thereon opposite a calibrated scale 22, the latter being calibrated in terms of gas pressure or volume.

The centerplate 12 has a central opening 23 around the shaft 15, into which the passage 16 discharges through a slot 24, and into which extend the inner ends of radial passages 26. The outer ends of the passages 26 terminate in transverse passages 27 through the centerplate, which extend in alignment with and discharge into the interiors of the blades 13.

When the valve 18 is opened, compressed air is supplied through the passage 16, slot 24, opening 23, and passages 26 and 27 into the interiors of the blades 13.

Figure 4:
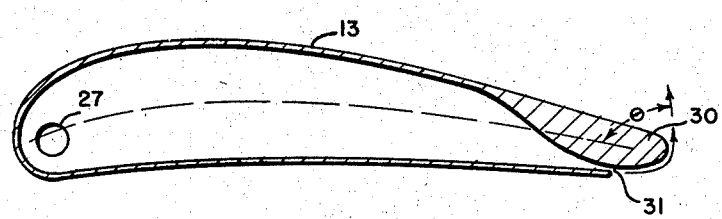
Fig. 4 is an enlarged, sectional view of another form of airfoil blade embodying my invention.

The blade 13 of Fig. 4 has a curved, peripheral, trailing edge portion 30 which merges with the convex, driving side or face of the blade, and which curves towards and past the trailing edge of the trailing face of the blade. The trailing face of the blade is spaced from the curved portion 30 to provide a blowing slot 31 through which compressed air supplied into the interiors of the blade is discharged. The slot 31 discharges compressed air in a jet which is tangential to the adjacent surface of the curved portion 30. The air blown from the slot 31 adheres by the Coanda effect to the curved blade tip, and is directed forwardly at a substantially large angle $\theta$ to the chord line of the blade as shown by the arrow on Fig. 4.

Fig. 3 shows a blade 13A having a curved trailing edge portion 30A corresponding to the portion 30 of Fig. 4, and has spaced from the portion 30A a splitter sheet 34 at the trailing face of the blade, and which forms with the curved portion 30A a blowing slot 35 which discharges a jet of compressed air tangential to the adjacent surface of the portion 30A. The trailing end of the trailing face of the blade is spaced from the sheet 34 to form another blowing slot 36 which discharges compressed air in a jet which is tangential to the adjacent surface of the sheet 34. The air blown from the slot 35 adheres by the Coanda effect to the curved end of the blade portion 30A, and the air blown from the slot 36 adheres by the Coanda effect to the curved trailing end portion of the sheet 34. The air jets from the two slots combine to form a wider air jet which is projected forwardly at a substantial angle to the chord line of the blade as shown by the arrows on Fig. 3.

Figure 5:
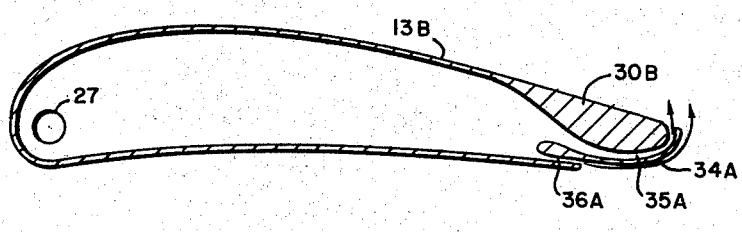
Fig. 5 is an enlarged, sectional view, of still another form of airfoil blade embodying my invention.

Fig. 5 shows a blade 13B which is similar to the blade 13A of Fig. 3 except that it has a splitter sheet 34A which is spaced from the curved trailing end portion 30B all of the way up to the driving face of the blade so that the Coanda effect is not depended upon to cause the air jet blown from the slot 35A to be projected at a substantial angle to the chord line of the blade, the outer end of the sheet 34A performing this guiding function. The slot 36A corresponds to and performs in the same way as does the slot 36 of Fig. 4, using the Coanda effect to deflect the air jet it discharges.

The compressed air passing out of the slots definitely does not act to maintain boundary layer flow. On the contrary, it greatly disturbs boundary layer flow adjacent the trailing edges of the blades. The action is not exactly understood. Airfoil fan blades do not act like airplane wings since they are rotated instead of advancing along relatively straight paths. Many more variables are involved than in the case of airplane wings, such as centrifugal force, Coriolis force, and the effect of the casing around the rotor. It is believed, however, that the air or other gas discharged from the blade slots acts somewhat as outwardly extending flaps at the trailing edges of the blades, but without the disadvantages of physical flaps such as mass, resistance, and the mechanical problems of adjustment.

It has been found that for maximum performance, the angle that the air jet makes with the chord line, shown as the angle θ on Fig. 4, should be between 15° to 120°. The sum of the slot widths of a blade should preferably vary between 0.5% and 10% of the chord length. The slots preferably extend the widths of the blades.

In the annexed claims, "backwardly curved airfoil blades" are defined as "airfoil blades having convex gas impacting or driving sides or faces, having leading edges or noses which first impact the gas passing the blades, and having trailing edges or tips which are downstream with respect to gas flow, of the noses."

The centerplate of a double inlet fan is, of course, the back plate of each fan section, and corresponds to the back plate of a centrifugal fan having a single rotor. Therefore, the term "back plate" as used in the annexed claims should be interpreted as a centerplate where the fan involved is a double inlet one.

I claim as my invention:

1. A gas reaction rotor having secured thereto a plurality of spaced-apart, backwardly curved blades having airfoil sections with convex driving faces and opposite trailing faces, each of said blades having a rounded trailing edge with a curved portion which curves towards and merges with the driving face of said blade, and with a reversely curved portion which curves into and merges with said first mentioned curved portion and which curves towards the trailing face of said blade, said trailing face having a trailing end which is spaced from said reversely curved portion to form therewith a blowing slot tangential to said last mentioned curved portion, and means for supplying compressed gas into the interiors of said blades and out said slots.

2. A gas reaction rotor as claimed in claim 1 in which a curved splitter sheet which follows the curvature of said reversely curved portion extends through each of said slots for dividing each slot into two slots.

3. A gas reaction rotor as claimed in claim 2 in which said splitter sheet extends around said reversely curved portion of said rounded trailing edge and is spaced therefrom to form a blowing slot substantially flush with said driving face of said blade.

4. A centrifugal fan rotor having a side plate with an axial gas inlet opening, and having a back plate spaced from said side plate, a plurality of spaced-apart blades supported from said plates between said plates, said blades having airfoil sections with convex driving faces and opposite trailing faces, said blades having noses adjacent said inlet, and having trailing edges adjacent the periphery of said side plate, each of said blades having a rounded trailing edge with a curved portion which curves towards and merges with the driving face of said blade, and with a reversely curved portion which curves into and merges with said first mentioned curved portion and which curves towards the trailing face of said blade, said trailing face having a trailing end which is spaced from said reversely curved portion to form therewith a blowing slot tangential to said last mentioned curved portion, and means for supplying compressed gas into the interiors of said blades and out said slots.

5. A centrifugal fan rotor as claimed in claim 4 in which the means for supplying gas under pressure into the interiors of the blades includes passages in said back plate.

References Cited in the file of this patent
UNITED STATES PATENTS

| | | |
|---|---|---|
| 2,076,586 | Noble | Apr. 13, 1937 |
| 2,305,226 | Stalker | Dec. 15, 1942 |
| 2,476,001 | Stalker | July 12, 1949 |
| 2,476,002 | Stalker | July 12, 1949 |
| 2,489,683 | Stalker | Nov. 29, 1949 |
| 2,649,243 | Stalker | Aug. 18, 1953 |

FOREIGN PATENTS

| | | |
|---|---|---|
| 475,711 | Germany | May 2, 1929 |
| 586,010 | Germany | July 9, 1931 |